(12) United States Patent
Gutierrez (10) Patent No.: US 12,351,374 B2
(45) Date of Patent: Jul. 8, 2025

(54) COOLER STAND

(71) Applicant: Armando Gutierrez, Corpus Christi, TX (US)

(72) Inventor: Armando Gutierrez, Corpus Christi, TX (US)

( * ) Notice: Subject to any disclaimer, the term of this patent is extended or adjusted under 35 U.S.C. 154(b) by 35 days.

(21) Appl. No.: 18/524,071

(22) Filed: Nov. 30, 2023

(65) Prior Publication Data

US 2025/0178808 A1    Jun. 5, 2025

(51) Int. Cl.
*B65D 61/00* (2006.01)
*B65D 81/38* (2006.01)
*F16M 11/22* (2006.01)

(52) U.S. Cl.
CPC ......... *B65D 61/00* (2013.01); *B65D 81/3813* (2013.01); *F16M 11/22* (2013.01)

(58) Field of Classification Search
CPC ..... B65D 61/00; B65D 81/3813; F16M 11/22
See application file for complete search history.

(56) References Cited

U.S. PATENT DOCUMENTS

| | | | | |
|---|---|---|---|---|
| 1,392,486 A | * | 10/1921 | Dice | A47B 81/007 248/150 |
| 1,929,136 A | * | 10/1933 | Bertels | A47F 5/01 248/150 |
| 2,083,852 A | | 6/1937 | McClanahan | |
| D250,686 S | * | 1/1979 | Ashcraft | D6/403 |
| 5,370,245 A | * | 12/1994 | Tersch | A47B 73/006 211/74 |
| 5,551,558 A | | 9/1996 | Bureau | |
| 6,595,475 B2 | * | 7/2003 | Svabek | A47B 73/002 211/195 |
| 6,814,333 B1 | * | 11/2004 | Freiburger | F16M 11/38 248/164 |
| 7,055,834 B1 | * | 6/2006 | White | B62B 3/10 280/47.35 |
| 7,341,164 B2 | | 3/2008 | Barquist | |
| D568,066 S | * | 5/2008 | Cohen | D6/681 |
| D568,067 S | * | 5/2008 | Cohen | D6/682 |
| D568,636 S | * | 5/2008 | Cohen | D6/682 |
| 7,798,465 B1 | * | 9/2010 | Meverden | F24F 13/0209 248/679 |
| 8,087,678 B2 | * | 1/2012 | Nowak | B62B 1/264 280/35 |
| 8,882,064 B2 | * | 11/2014 | Gregg, Jr. | F16M 11/38 108/118 |

(Continued)

FOREIGN PATENT DOCUMENTS

CA    2815443    2/2014

*Primary Examiner* — Monica E Millner (57) ABSTRACT

A cooler stand apparatus for supporting a cooler above a ground surface includes a platform, a plurality of legs, and a holder. The holder is spaced in a first direction away from the platform, and the legs extend in a second direction opposite the first away from the platform. The platform is positionable in a raising position such that the legs space the platform above a ground surface and the holder secures a cooler on the platform. The platform is also positionable in a storage position such that the cooler is supported by a different surface of the platform and is surrounded by the legs. Retainers are provided for securing the cooler to the platform when the platform supports the cooler while in the storage position.

9 Claims, 8 Drawing Sheets

(56) References Cited

U.S. PATENT DOCUMENTS

2015/0061512 A1  3/2015  Takahashi et al.
2017/0023292 A1  1/2017  Marinelli
2021/0396347 A1* 12/2021  Stein .................... F16M 11/046

* cited by examiner

COOLER STAND

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cooler stands and more particularly pertains to a new cooler stand for supporting a cooler above a ground surface.

(2) Description of Related Art Including Information Disclosed Under 37 CFR 1.97 and 1.98

The prior art describes myriad cooler stands, including ones which collapse in various ways for storage purposes. However, the prior art fails to disclose such a cooler stand with a platform, a holder spaced a first direction away from the platform, and a plurality of legs attached to the platform and extending in a second direction opposite the first direction away from the platform. Such an apparatus may be used to secure a cooler to the platform via the holder above the ground in one orientation while positioning the cooler on the platform and between the plurality of legs in another orientation for storage.

BRIEF SUMMARY OF THE INVENTION

An embodiment of the disclosure meets the needs presented above by generally comprising a platform with a first side and a second side positioned opposite each other. The first side faces a first direction, and the second side faces a second direction opposite the first direction. The platform is alternately positionable in a raising position and a storage position, wherein the first side faces upwardly when the platform is positioned in the raising position and the second side faces upwardly when the platform is positioned in the storage position. The platform is configured for supporting a cooler in either of the raising position and the storage position. A plurality of legs is coupled to the platform and extends in the second direction from the platform. A holder is coupled to the platform and is spaced in the first direction away from the platform. The holder comprises a front member and a rear member which are spaced from each other across the platform such that the holder is configured to receive the cooler between the front member and rear member and prevent forward and rearward movement of the cooler when the platform supports the cooler while in the raising position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
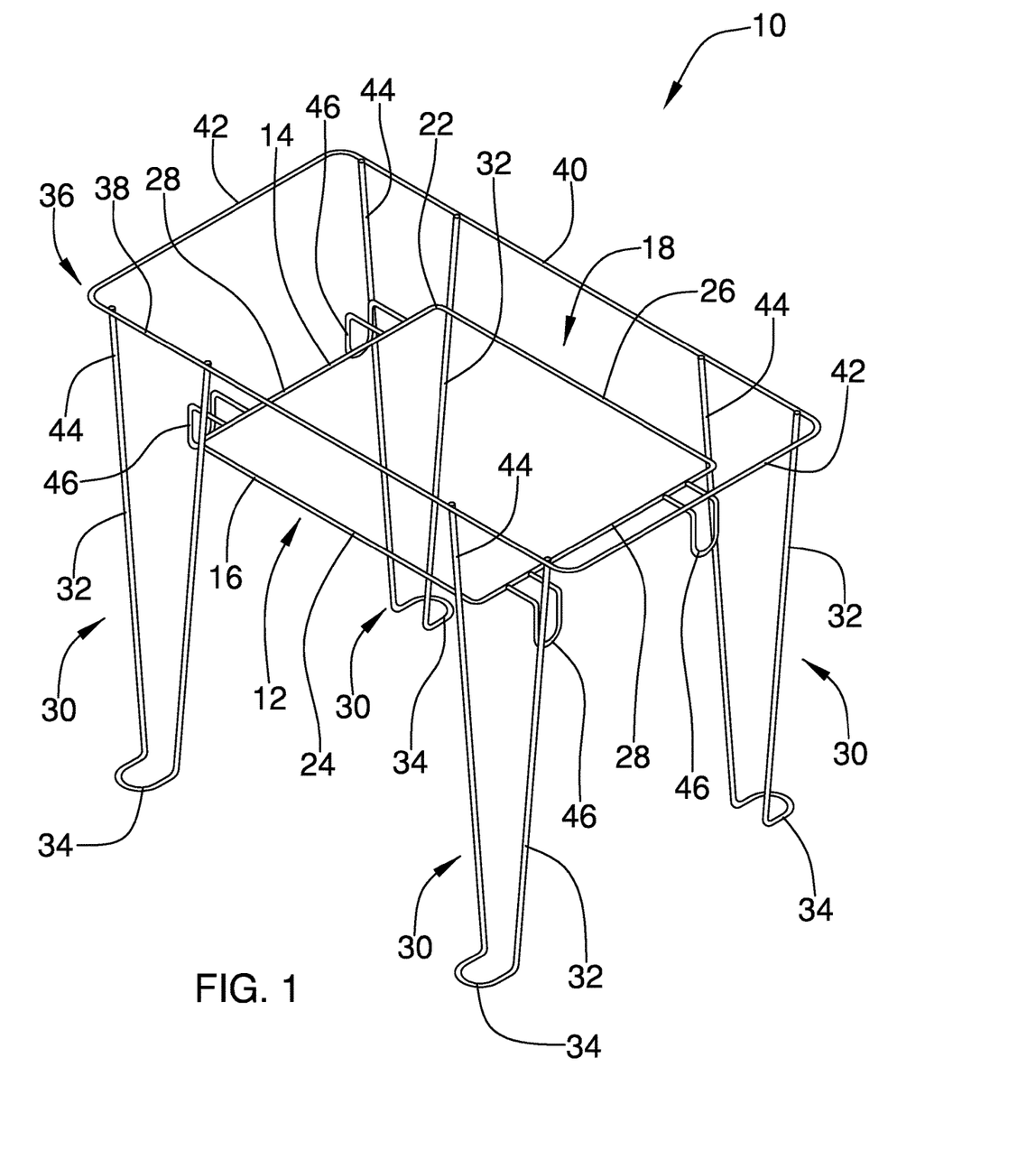
FIG. 1 is a perspective view of a cooler stand apparatus according to an embodiment of the disclosure.
Figure 2:
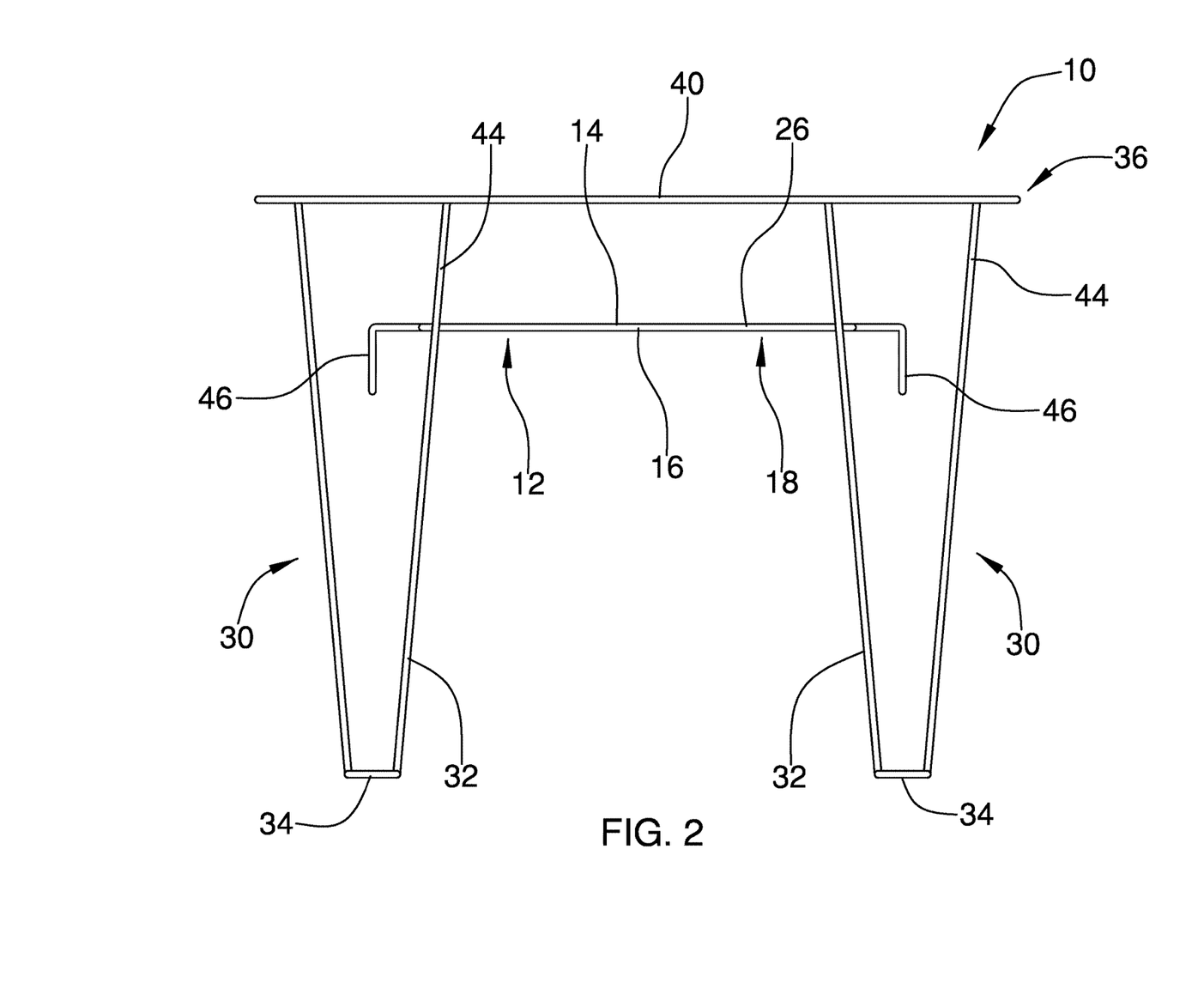
FIG. 2 is a rear view of an embodiment of the disclosure.
Figure 3:
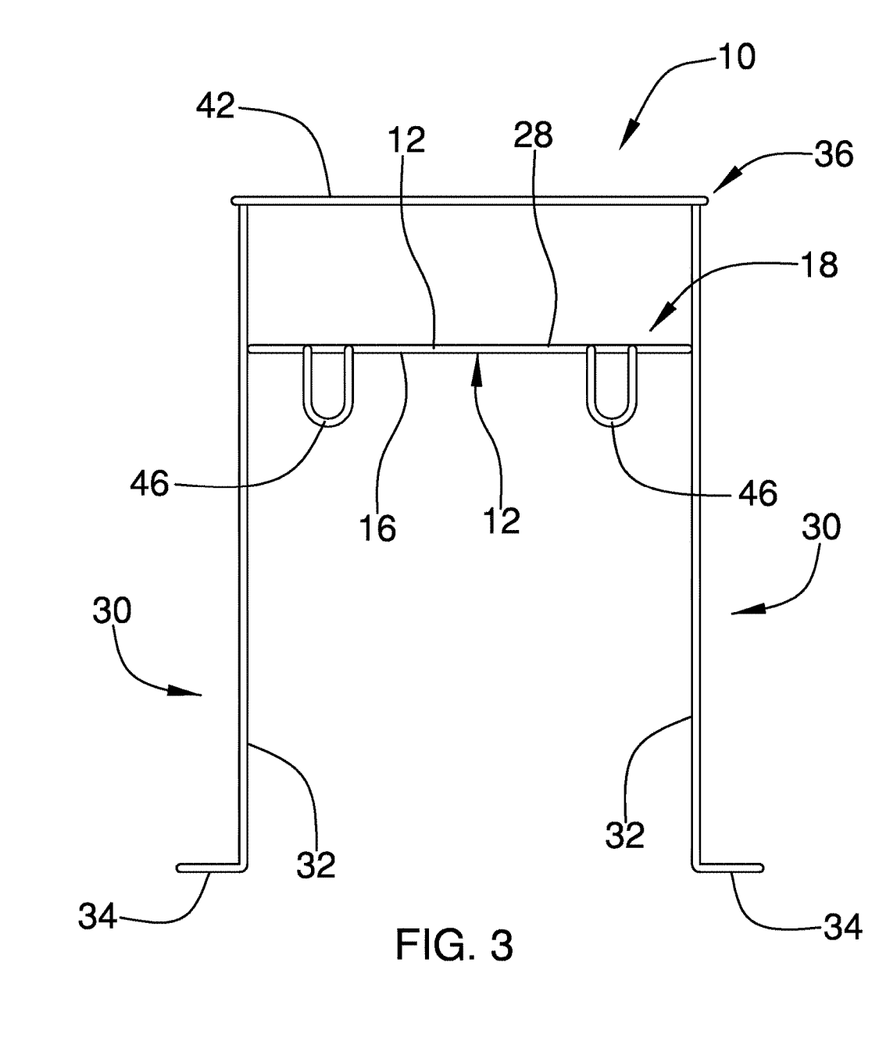
FIG. 3 is a side view of an embodiment of the disclosure.
Figure 4:
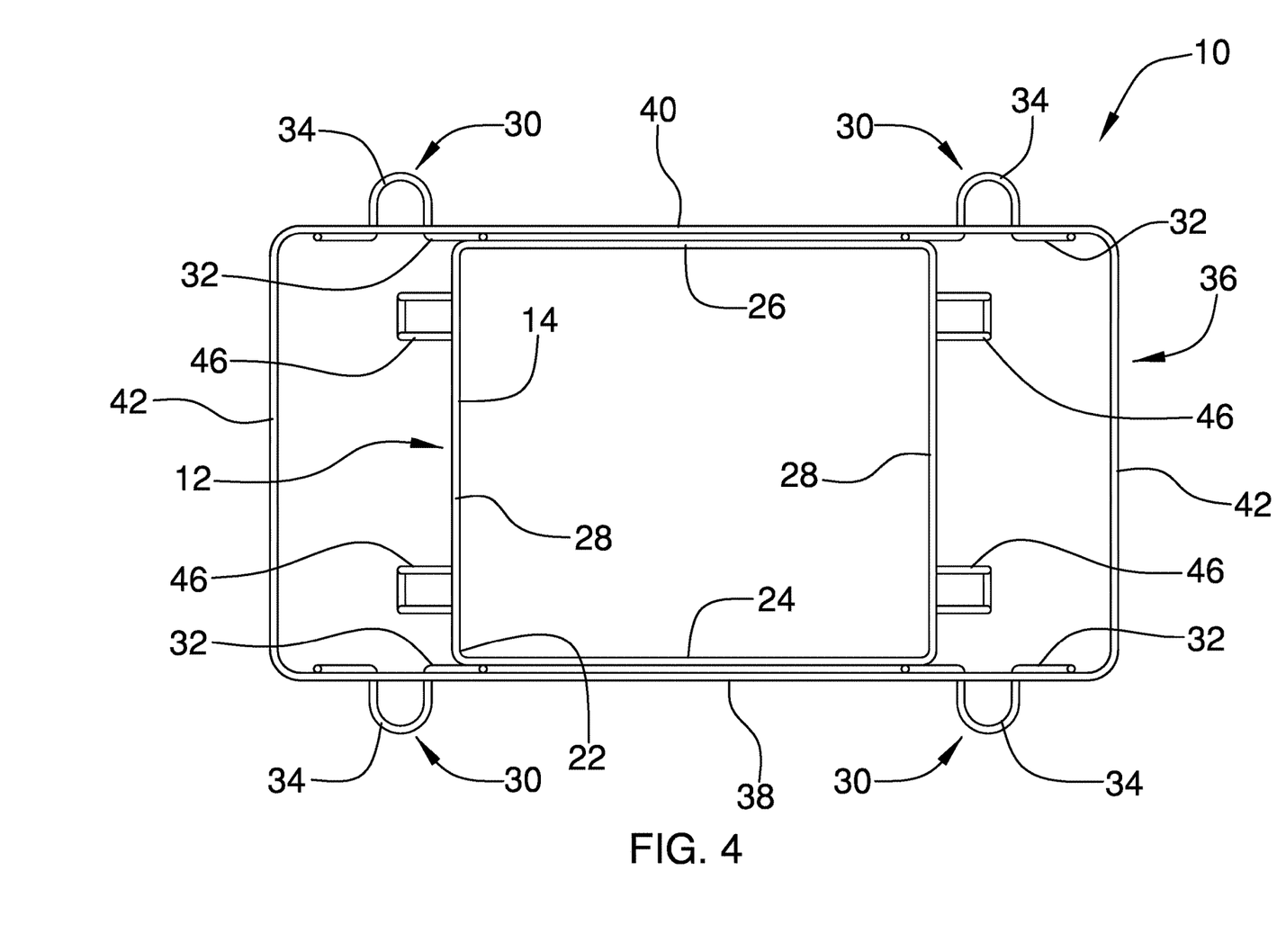
FIG. 4 is a top view of an embodiment of the disclosure.
Figure 5:
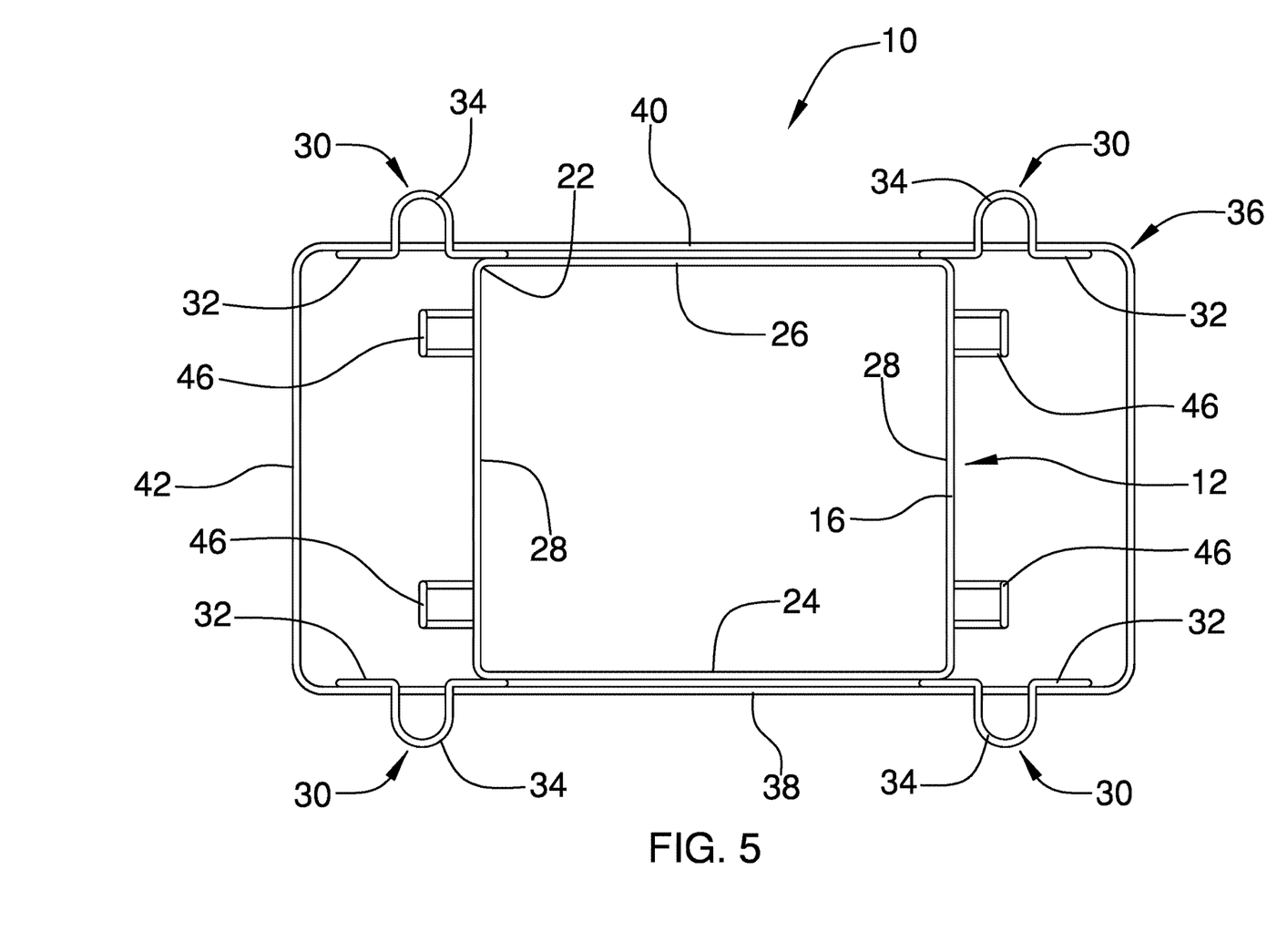
FIG. 5 is a bottom view of an embodiment of the disclosure.
Figure 6:
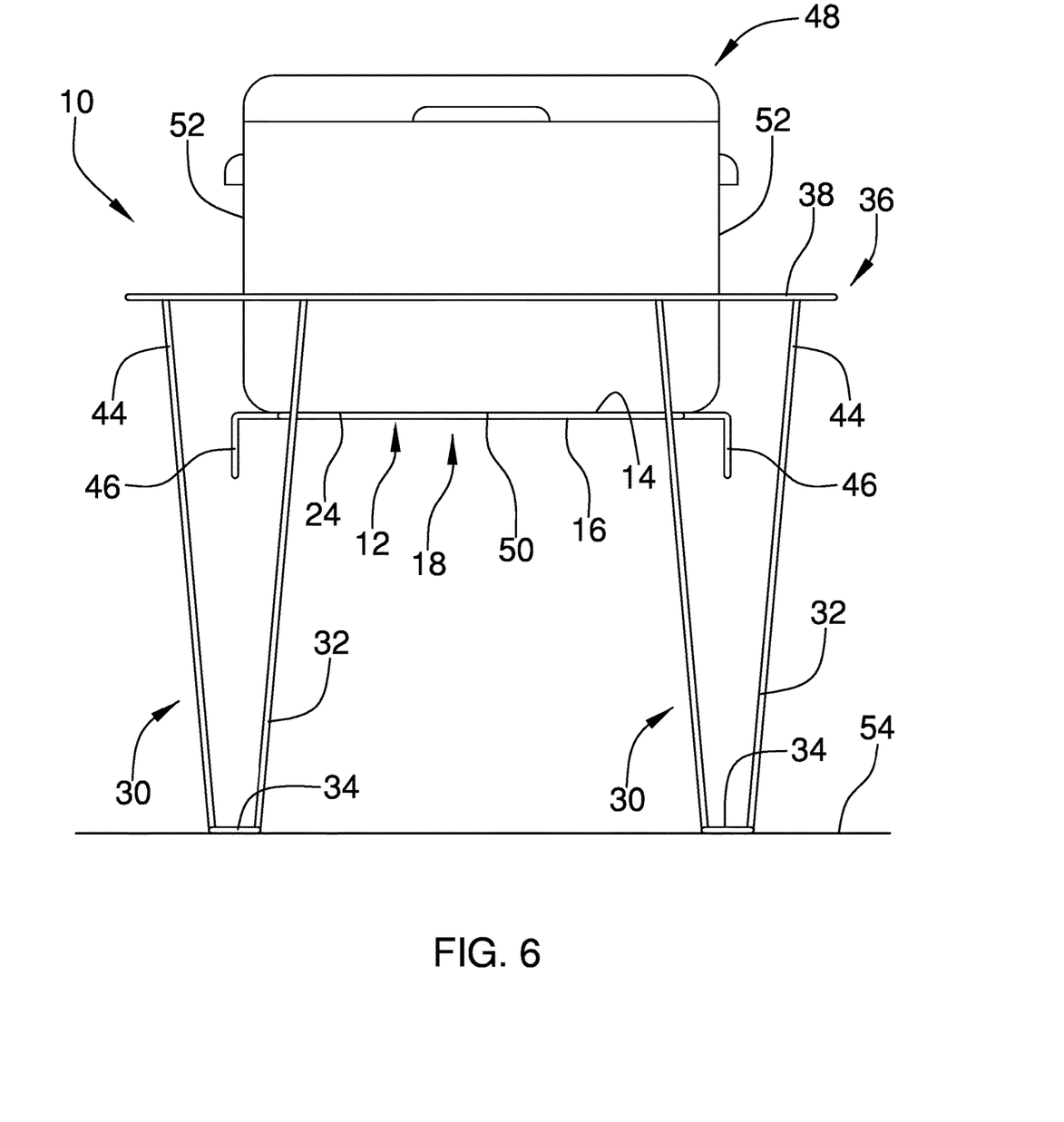
FIG. 6 is an in-use view of an embodiment of the disclosure with a platform positioned in a raising position to support a cooler above a ground surface.
Figure 7:
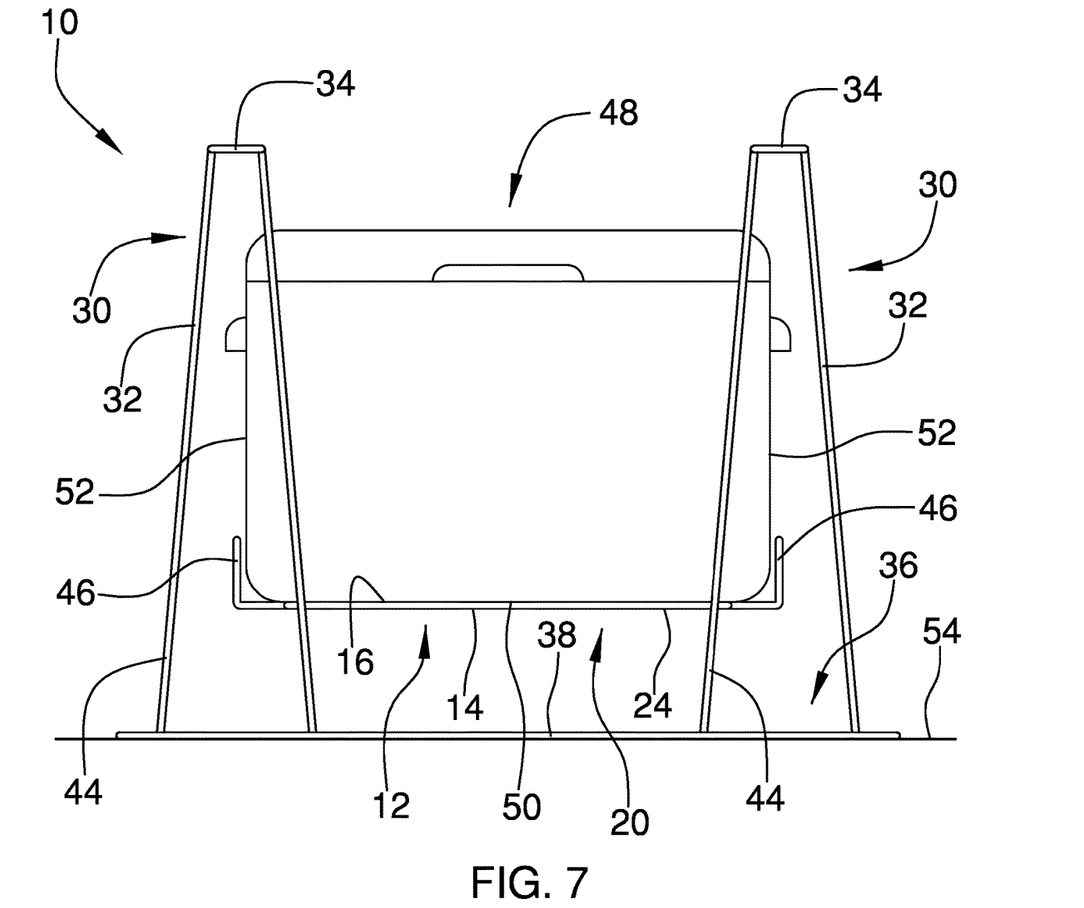
FIG. 7 is an in-use view of an embodiment of the disclosure with a platform positioned in a storage position to support a cooler in a volume surrounded by a plurality of legs.
Figure 8:
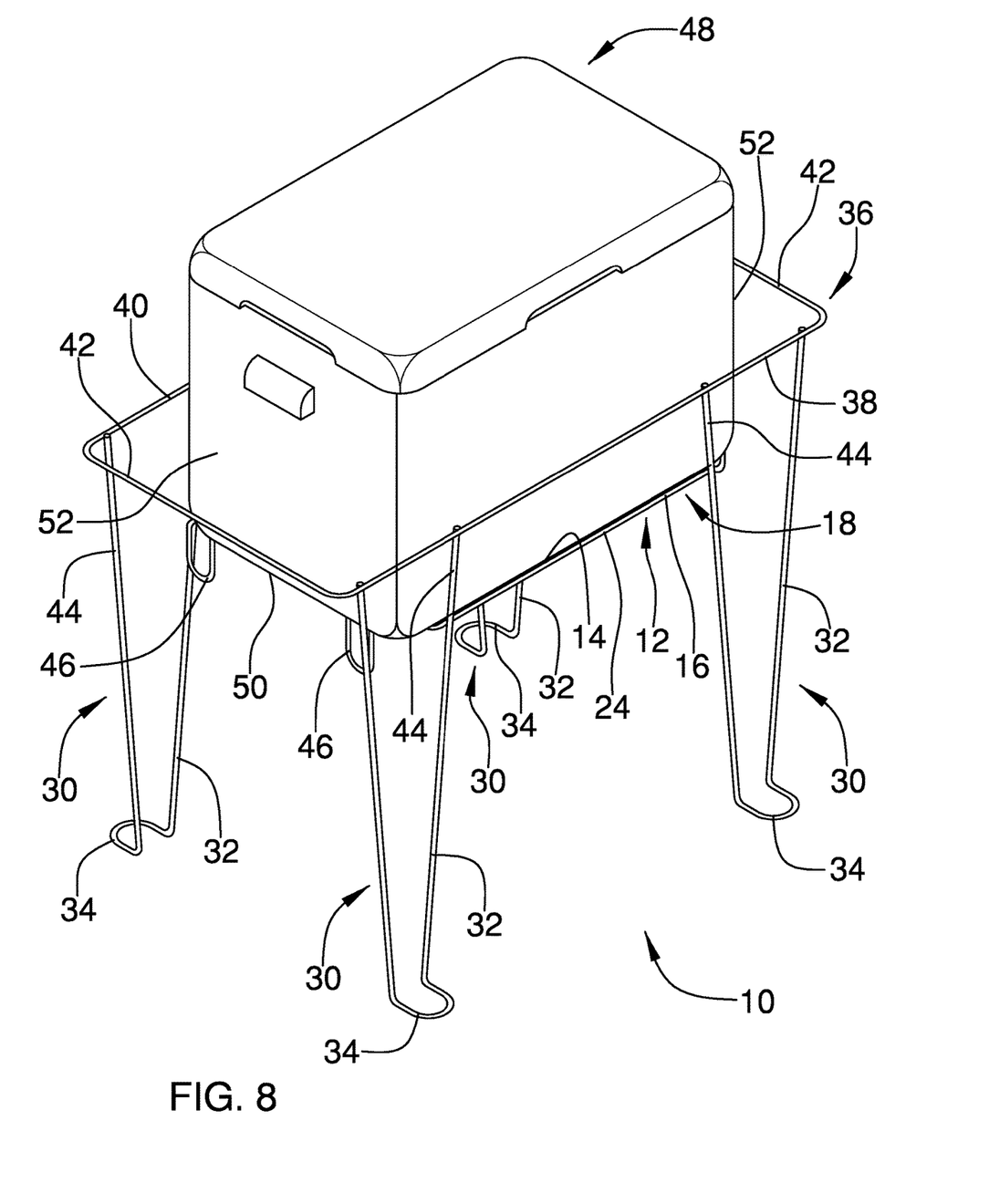
FIG. 8 is a perspective in-use view of an embodiment of the disclosure with a platform positioned in a raising position to support a cooler above a ground surface.

With reference now to the drawings, and in particular to FIGS. 1 through 8 thereof, a new cooler stand embodying the principles and concepts of an embodiment of the disclosure and generally designated by the reference numeral 10 will be described.

As best illustrated in FIGS. 1 through 8, the cooler stand apparatus 10 generally comprises a platform 12 has a first side 14 and a second side 16 positioned opposite each other. The first side 14 faces a first direction, and the second side 16 faces a second direction opposite the first direction. The platform 12 is alternately positionable in a raising position 18 and a storage position 20. The first side 14 faces upwardly when the platform 12 is positioned in the raising position 18, and the second side 16 faces upwardly when the platform 12 is positioned in the storage position 20. In either one of the raising position 18 and the storage position 20, the platform 12 is configured for supporting a cooler 48 thereon. The platform 12 forms a platform closed loop 22 which has a rectangular shape, but any suitable shape for supporting a bottom surface 50 of the cooler 48 may be used.

A plurality of legs 30 is coupled to the platform 12 and extends in the second direction from the platform 12. Each leg 30 is positioned on an associated one of a front portion 24 and a rear portion 26 of the platform 12 so that, when the platform 12 supports the cooler 48 while in the storage position 20, the legs 30 inhibit the cooler 48 from moving forwardly and rearwardly with respect to the platform 12. Each leg 30 has a length such that the leg 30 is configured to extend past the cooler 48 when the platform 12 supports the cooler 48 while in the storage position 20. Each leg 30 of the plurality of legs 30 has an extension portion 32 and a foot portion 34, wherein the extension portion 32 extends between the platform 12 and the foot portion 34 and the foot portion 34 extends outwardly from the extension portion 32 with respect to the platform 12. While four legs 30 are shown in the Figures, it is contemplated that other embodiments may have different quantities. For example, a larger, heavier cooler 48 may require the cooler stand apparatus 10 to have an additional leg 30 attached to the front portion 24 of the platform 12 and another leg 30 attached to the rear portion 26.

A holder 36 is coupled to the platform 12 and is spaced in the first direction away from the platform 12. The holder 36 comprises a front member 38 and a rear member 40 which are spaced from each other across the platform 12 such that the holder 36 is configured to receive the cooler 48 between the front member 38 and rear member 40. The front member 38 and the rear member 40 act to prevent forward and rearward movement of the cooler 48 when the platform 12 supports the cooler 48 while in the raising position 18. The front member 38 and the rear member 40 may typically abut the cooler 48 when the platform 12 supports the cooler 48 while in the raising position 18 but may also be spaced from the cooler 48 in some embodiments. The holder 36 also comprises a pair of lateral members 42, each of which is coupled to and extends between the front member 38 and the rear member 40. The front member 38, the rear member 40, and the pair of lateral members 42 form a holder closed loop 44 which extends around the cooler 48 when the platform 12 supports the cooler 48 while in the raising position 18. The lateral members 42 may also act to inhibit lateral motion of the cooler 48 with respect to the platform 12.

A plurality of holder supports 44 couples the holder 36 to the platform 12 by being coupled to and extending between the platform 12 and the holder 36. Each holder support 44 of the plurality of holder supports 44 is integrally formed with an associated leg 30 of the plurality of legs 30 but may be separately formed in some embodiments.

A plurality of retainers 46 is mounted to the platform 12. Each retainer 46 of the plurality of retainers 46 is positioned on an associated one of a pair of lateral portions 28 of the platform 12, and is thus positioned to inhibit lateral motion of the cooler 48 with respect to the cooler 48 when the platform 12 supports the cooler 48 while in the storage position 20. Each retainer 46 has an L-shape. Each retainer 46 extends outwardly from the platform 12 with respect to the platform 12 and toward the second direction to engage an associated lateral side 52 of a pair of lateral sides 52 of the cooler 48.

Each of the platform 12, the legs 30, the holder 36, the holder supports 44, and the retainers 46 are formed of wires which generally follow outer boundaries of the same. Other materials and forms are contemplated, such as molded plastic, boards or panels which are fastened together, or the like. It is noted, however, that there are advantages to the wire-form construction over other forms. A wire-form construction facilitates the cooler stand apparatus 10 to have a lower density than other apparatuses of similar size and shape. And the wire-form construction permits free passage of objects and wind through the cooler stand apparatus 10. For example, sand, soil, and the like which would be caught in nooks and crannies of other designs will freely fall through various openings formed in the wire-form construction. Sand, soil, and the like may also facilitate securing the cooler stand apparatus 10 to a ground surface 54 by packing around portions of the foot portions 34 of the legs 30. Wind may pass through the various openings to limit the possibility of blowing the cooler stand apparatus 10 over. And tethers or other mounting apparatuses may interlock with the cooler stand apparatus 10 without the need for additional brackets, eyelets, or other mounting components.

In use, the cooler stand apparatus 10 supports the cooler 48 in either the raising position 18 or the storage position 20. In the raising position 18, the platform 12 of the cooler stand apparatus 10 holds the cooler 48 above the ground surface 54 upon which the foot portions 34 of the legs 30 are placed. In such raising position 18, the cooler stand apparatus 10 facilitates easier access to the cooler 48 than if the cooler 48 were set directly on the ground surface 54 by limiting bending to access the cooler 48 and its contents. The holder 36 acts to prevent motion of the cooler 48 relative to the platform 12. The legs 30 stabilize the cooler stand apparatus 10 even in uneven terrain by engaging spaced regions of the ground surface 54 when the legs 30 are placed upon the ground surface 54.

In the storage position 20, the platform 12 of the cooler stand apparatus 10 holds the cooler 48 in a volume surrounded by the legs 30, which presents a more compact storage arrangement than when the platform 12 holds the cooler 48 while in the raising position 18. Tethers, such as bungee cords, ropes, chains, or the like, may be used to further secure the cooler 48 to the cooler stand apparatus 10 when the platform 12 is in the storage position 20. In one example, a pair of tethers may be tied around associated lateral members 42 of the pair of lateral members 42 of the holder 36 and hook, tie, or otherwise engage the cooler 48. Additional mounting brackets, eyelets, or the like may be provided to further facilitate connecting tethers to the cooler 48 and the cooler stand apparatus 10. Tethers may also be used to secure the cooler 48 to the cooler stand when the platform 12 supports the cooler 48 while in the raising position 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cooler stand apparatus comprising:
   a platform having a first side and a second side positioned opposite each other, the first side facing a first direction, the second side facing a second direction opposite the first direction, the platform being alternately positionable in a raising position and a storage position, the first side facing upwardly when the platform is positioned in the raising position, the second side facing upwardly when the platform is positioned in the storage position, the platform being configured for supporting a cooler in either of the raising position and the storage position;
   a plurality of legs coupled to the platform, the plurality of legs extending in the second direction from the platform; and
   a holder coupled to the platform and spaced in the first direction away from the platform, the holder comprising a front member and a rear member which are spaced from each other across the platform such that the holder is configured to receive the cooler between the front member and rear member and prevent forward and rearward movement of the cooler when the platform supports the cooler while in the raising position, the holder comprising a pair of lateral members, each lateral member of the pair of lateral members being coupled to and extending between the front member and the rear member, wherein the front member, the rear member, and the pair of lateral members form a holder closed loop.

2. The apparatus of claim 1, wherein the platform forms a platform closed loop, the platform closed loop having a shape configured to support a bottom surface of the cooler.

3. The apparatus of claim 2, wherein the platform closed loop has a rectangular shape.

4. The apparatus of claim 1, wherein each leg of the plurality of legs is positioned on an associated one of a front portion and a rear portion of the platform, the plurality of legs being configured to inhibit the cooler from moving forwardly and rearwardly with respect to the platform when the platform supports the cooler while in the storage position.

5. The apparatus of claim 1, wherein each leg of the plurality of legs has a length such that the leg is configured to extend past the cooler when the platform supports the cooler while in the storage position.

6. The apparatus of claim 1, wherein each leg of the plurality of legs has an extension portion and a foot portion, the extension portion extending between the platform and the foot portion, the foot portion extending outwardly from the extension portion with respect to the platform.

7. The apparatus of claim 1, further comprising a plurality of holder supports coupling the holder to the platform, each holder support of the plurality of holder supports being integrally formed with an associated leg of the plurality of legs.

8. A cooler stand apparatus comprising:
   a platform having a first side and a second side positioned opposite each other, the first side facing a first direction, the second side facing a second direction opposite the first direction, the platform being alternately positionable in a raising position and a storage position, the first side facing upwardly when the platform is positioned in the raising position, the second side facing upwardly when the platform is positioned in the storage position, the platform being configured for supporting a cooler in either of the raising position and the storage position;
   a plurality of legs coupled to the platform, the plurality of legs extending in the second direction from the platform;
   a holder coupled to the platform and spaced in the first direction away from the platform, the holder comprising a front member and a rear member which are spaced from each other across the platform such that the holder is configured to receive the cooler between the front member and rear member and prevent forward and rearward movement of the cooler when the platform supports the cooler while in the raising position; and
   a plurality of retainers mounted to the platform, each retainer of the plurality of retainers being positioned on an associated one of a pair of lateral portions of the platform, the plurality of retainers being positioned to be configured to inhibit lateral motion of the cooler with respect to the cooler when the platform supports the cooler while in the storage position, each retainer of the plurality of retainers having an L-shape, each retainer of the plurality of retainers extending outwardly from the platform with respect to the platform and toward the second direction.

9. A cooler stand apparatus comprising:
   a platform having a first side and a second side positioned opposite each other, the first side facing a first direction, the second side facing a second direction opposite the first direction, the platform being alternately positionable in a raising position and a storage position, the first side facing upwardly when the platform is positioned in the raising position, the second side facing upwardly when the platform is positioned in the storage position, the platform being configured for supporting a cooler in either of the raising position and the storage position, the platform forming a platform closed loop, the platform closed loop having a shape configured to support a bottom surface of the cooler, the platform closed loop having a rectangular shape;
   a plurality of legs coupled to the platform, the plurality of legs extending in the second direction from the platform, each leg of the plurality of legs being positioned on an associated one of a front portion and a rear portion of the platform, the plurality of legs being configured to inhibit the cooler from moving forwardly and rearwardly with respect to the platform when the platform supports the cooler while in the storage position, each leg of the plurality of legs having a length such that the leg is configured to extend past the cooler when the platform supports the cooler while in the storage position, each leg of the plurality of legs having an extension portion and a foot portion, the extension portion extending between the platform and the foot portion, the foot portion extending outwardly from the extension portion with respect to the platform;
   a holder coupled to the platform and spaced in the first direction away from the platform, the holder comprising a front member and a rear member which are spaced from each other across the platform such that the holder is configured to receive the cooler between the front member and rear member and prevent forward and rearward movement of the cooler when the platform supports the cooler while in the raising position, the holder comprising a pair of lateral members, each lateral member of the pair of lateral members being coupled to and extending between the front member and the rear member, wherein the front member, the rear member, and the pair of lateral members form a holder closed loop;

a plurality of holder supports coupling the holder to the platform, each holder support of the plurality of holder supports being integrally formed with an associated leg of the plurality of legs; and a plurality of retainers mounted to the platform, each retainer of the plurality of retainers being positioned on an associated one of a pair of lateral portions of the platform, the plurality of retainers being positioned to be configured to inhibit lateral motion of the cooler with respect to the cooler when the platform supports the cooler while in the storage position, each retainer of the plurality of retainers having an L-shape, each retainer of the plurality of retainers extending outwardly from the platform with respect to the platform and toward the second direction.

* * * * *